United States Patent
Jung (10) Patent No.: US 9,505,060 B2
(45) Date of Patent: Nov. 29, 2016

(54) DEVICE FOR EMPLOYMENT IN A MACHINE TOOL AS WELL AS MACHINE TOOL

(71) Applicant: DECKEL MAHO PFRONTEN GMBH, Pfronten (DE)

(72) Inventor: Robert Jung, Pfronten (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 259 days.

(21) Appl. No.: 14/359,770

(22) PCT Filed: Nov. 20, 2012

(86) PCT No.: PCT/EP2012/073134
§ 371 (c)(1),
(2) Date: May 21, 2014

(87) PCT Pub. No.: WO2013/076097
PCT Pub. Date: May 30, 2013

(65) Prior Publication Data
US 2014/0300065 A1 Oct. 9, 2014

(30) Foreign Application Priority Data
Nov. 21, 2011 (DE) .................... 20 2011 108 153 U (51) Int. Cl.
*B23Q 5/20* (2006.01)
*B23B 31/02* (2006.01)
(Continued)

(52) U.S. Cl.
CPC ............. *B23B 31/02* (2013.01); *B23Q 1/0027* (2013.01); *B23Q 1/26* (2013.01); *B23Q 1/54* (2013.01);
(Continued)

(58) Field of Classification Search
CPC .... B23Q 1/0027; B23Q 1/5412; B23Q 5/20; B23C 1/12; Y10T 409/307672; Y10T 409/308232; Y10T 409/309296; Y10T 409/309352

USPC .................................. 409/201, 211, 230, 231
See application file for complete search history.

(56) References Cited

U.S. PATENT DOCUMENTS 4,069,741 A * 1/1978 Ewertowski ............ B23C 9/005
  408/237
4,652,190 A * 3/1987 Corsi ...................... B08B 15/04
  29/DIG. 84

(Continued)

FOREIGN PATENT DOCUMENTS

CN  1111182 A  11/1995
DE  27 27 434 B1  10/1978

(Continued)

OTHER PUBLICATIONS

JP 07-001206 Machine Translation, pp. 3-5, Mar. 30, 2016.*
(Continued)

*Primary Examiner* — Daniel Howell
*Assistant Examiner* — Nicole N Ramos
(74) *Attorney, Agent, or Firm* — Oliff PLC (57) ABSTRACT

A device for employment in a machine tool, including: a first unit; a second unit connected to the first unit, wherein the first unit is rotatable around a rotational axis relative to the second unit; a motor spindle connected to the second unit; a line feed-through extending along the rotational axis from the first to the second unit; lines extending from the interior of the first unit through the line feed-through as well as through the second unit into the motor spindle; and a line guiding device formed in the first unit and serving for guiding a part of the lines disposed in the first unit immediately in front of the line feed-through, wherein the line guiding device is formed in a plane oriented perpendicularly to the rotational axis, and wherein the line guiding device feeds the lines upon rotation of the second unit with respect to the first unit.

16 Claims, 5 Drawing Sheets

(51) Int. Cl.
  *B23Q 1/00*  (2006.01)
  *B23Q 1/26*  (2006.01)
  *B23Q 1/54*  (2006.01)
  *H02G 11/00*  (2006.01)
  *F16M 11/10*  (2006.01)
  *F16M 11/18*  (2006.01)
  *F16M 11/24*  (2006.01)

(52) U.S. Cl.
  CPC ............. *F16M 11/10* (2013.01); *F16M 11/18* (2013.01); *F16M 11/24* (2013.01); *H02G 11/00* (2013.01); *Y10T 279/34* (2015.01); *Y10T 409/30392* (2015.01); *Y10T 409/303976* (2015.01); *Y10T 409/304032* (2015.01); *Y10T 409/307672* (2015.01); *Y10T 409/309576* (2015.01)

(56) References Cited

U.S. PATENT DOCUMENTS

| | | | |
|---|---|---|---|
| 4,793,203 A * | 12/1988 | Staggl | B25J 9/08 174/110 F |
| 5,391,026 A * | 2/1995 | Wu | B23Q 1/54 409/201 |
| 5,533,846 A | 7/1996 | Geissler | |
| 5,697,270 A | 12/1997 | Link | |
| 5,813,283 A * | 9/1998 | Chen | B23Q 1/54 409/201 |
| 2004/0134050 A1* | 7/2004 | Geissler | B23Q 1/0036 29/26 A |
| 2005/0212193 A1 | 9/2005 | Omori et al. | |
| 2010/0266358 A1* | 10/2010 | Hiramoto | B23Q 11/0046 409/137 |
| 2010/0322734 A1* | 12/2010 | Tatsuda | B23Q 1/0009 409/231 |
| 2011/0058913 A1* | 3/2011 | Brieden | B23Q 5/045 409/211 |

FOREIGN PATENT DOCUMENTS

| | | | | |
|---|---|---|---|---|
| DE | 4320649 A1 * | 1/1995 | | B23Q 1/0027 |
| DE | 195 04 369 A1 | 8/1996 | | |
| DE | 10 2006 011 568 A1 | 9/2007 | | |
| DE | 60 2005 003 253 T2 | 9/2008 | | |
| EP | 0 664 176 A1 | 7/1995 | | |
| FR | EP 1405691 A1 * | 4/2004 | | B23Q 1/5412 |
| JP | A-60-167728 | 8/1985 | | |
| JP | A-61-121846 | 6/1986 | | |
| JP | 07001206 A * | 1/1995 | | |
| JP | A-2001-198749 | 7/2001 | | |
| JP | A-2002-273630 | 9/2002 | | |
| JP | 2009262274 A * | 11/2009 | | |
| TW | DE 19833959 A1 * | 2/2000 | | B23Q 5/20 |
| WO | WO 9215416 A1 * | 9/1992 | | B23Q 1/0027 |

OTHER PUBLICATIONS

Dec. 24, 2014 Office Action Issued in Chinese Application No. 201280057052.1.
International Search Report issued in International Application No. PCT/EP2012/073134 mailed Jan. 7, 2013.
International Preliminary Report on Patentability issued in International Application No. PCT/EP2012/073134 issued May 27, 2014.
Sep. 17, 2015 Office Action issued in Chinese Patent Application No. 201280057052.1.
Mar. 10, 2016 Office Action issued in Chinese Patent Application No. 201280057052.1.

* cited by examiner

DEVICE FOR EMPLOYMENT IN A MACHINE TOOL AS WELL AS MACHINE TOOL

The invention relates to a device for employment in a machine tool as well as to a machine tool.

Figure 1:
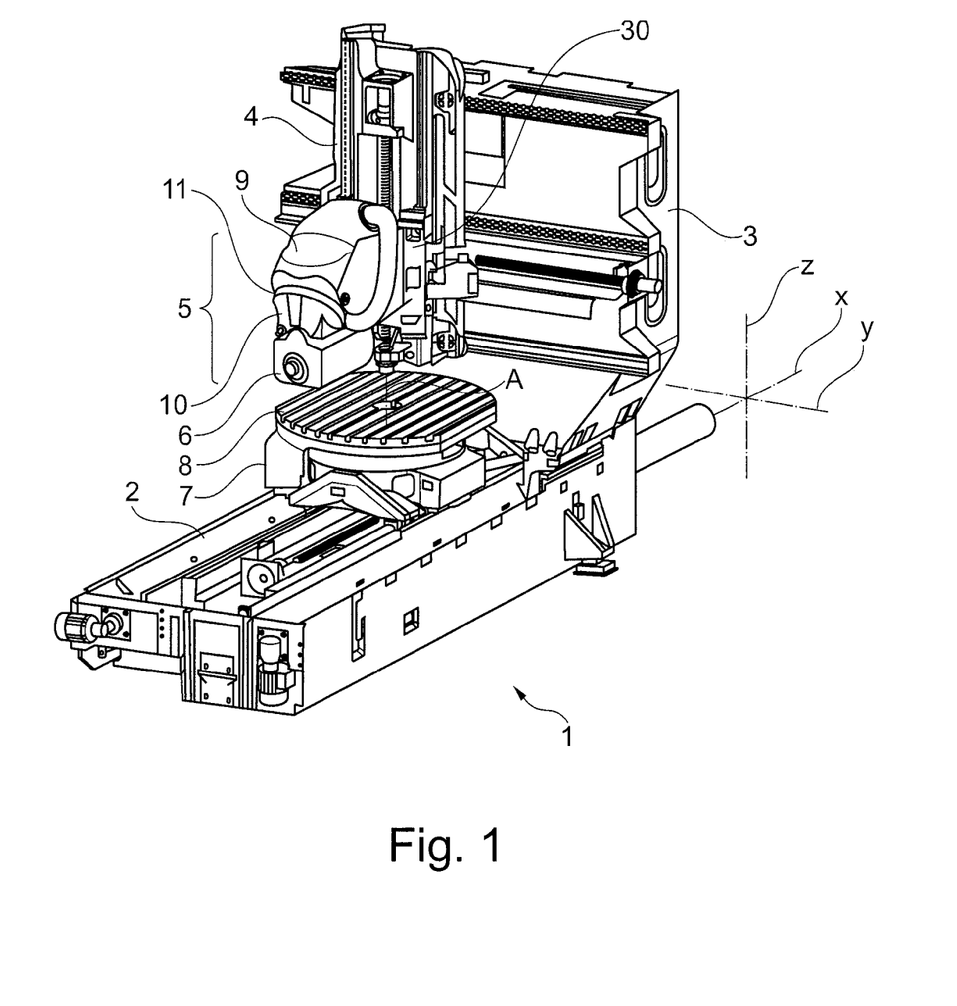
FIG. 1 an example of a conventional machine tool.

Machine tools are important production devices in the manufacturing industry. FIG. 1 shows an example of a machine tool 1, which has the following components: a first guide structure 2, a second guide structure 3, a third guide structure 4, a device 5, a carriage 7 as well as a rotary table 8. The carriage 7 is guidable along the first guide structure 2 in X-direction. The rotary table 8 is disposed on the carriage 7 and rotatable relatively with respect to the carriage 7 around an axis A. The second guide structure 3 is rigidly connected to the first guide structure 2 and allows guiding the third guide structure 4 in Y direction. The device 5 is guidable along the third guide structure 4 in Z direction. The device 5 has a first unit 9, a second unit 10 connected to the first unit 9 as well as a motor spindle 6 connected to the second unit 10, wherein the second unit 10 is rotatable around a rotational axis D (in a sectional plane 11) relative to the first unit 9. The motor spindle 6 is rigidly connected to the second unit 10. Further, the device 5 has a tube 12, which is manufactured of an elastic material and extends outside of the first unit 9 and the second unit 10 from an opening 13 in the first unit 9 to an opening 14 in the motor spindle 6. The tube 12 serves for receiving different lines, which provide electrical signals, fluids, drive flows and the like for the motor spindle 6.

Figure 2:
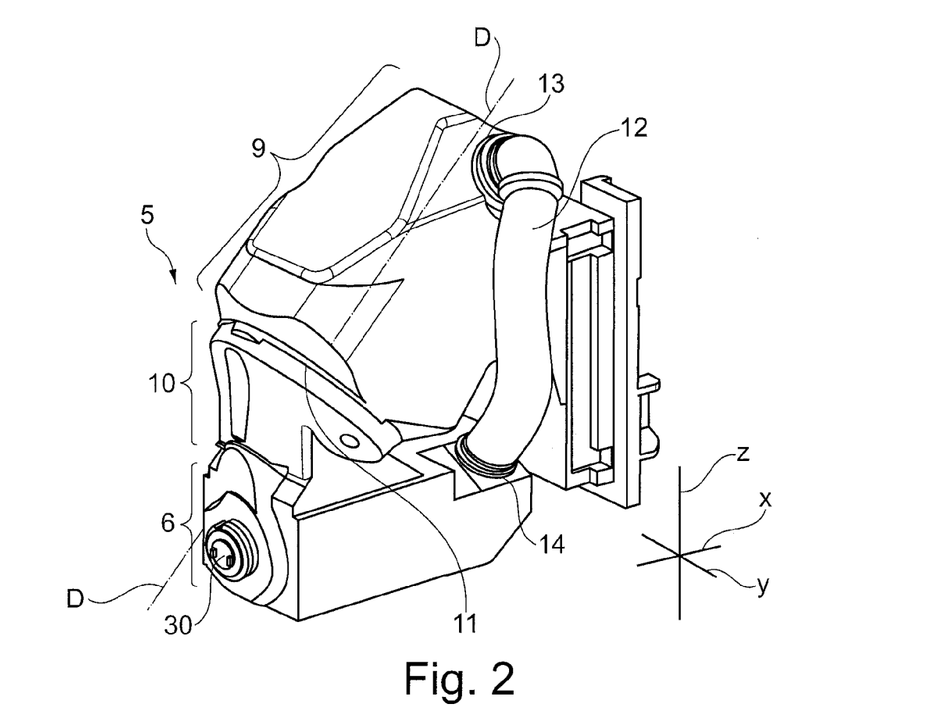
FIG. 2 a device shown in FIG. 1 in a first rotational state.
Figure 3:
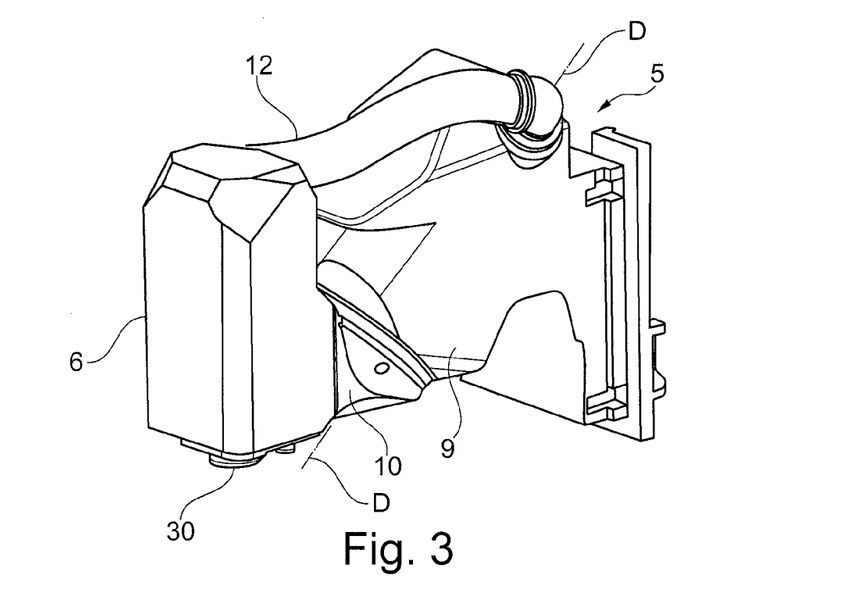
FIG. 3 a device shown in FIG. 1 in a second rotational state.

It is disadvantageous in the construction of the device 5 that by provision of the tube 12, the rotational freedom of the second unit 10 and thereby of the motor spindle 6 with respect to the first unit 9 is restricted. This is illustrated in FIGS. 2 and 3: FIG. 2 shows a state of the device 5, in which an opening 30 of the motor spindle 6 for receiving a spindle tool is oriented parallel to the X-direction. FIG. 3 shows a state of the device 5, in which the opening 30 of the motor spindle 6 is oriented parallel to the Z direction. As is apparent from FIG. 3, further counterclockwise rotation of the second unit 10 with respect to the first unit 9 is not possible since in this case the tube 12 would assume a tensioned state, which prevents further rotation.

Therefore, the object underlying the invention is to specify a device, by which the above described problems can be avoided.

For solving this object, the invention provides a device according to claim 1 as well as a machine tool according to claim 8. Advantageous configurations or developments of the inventive idea are found in the dependent claims.

According to an embodiment of the invention, a device for employment in a machine tool is provided, including: a first unit; a second unit connected to the first unit, wherein the first unit is rotatable around a rotational axis relative to the second unit; a motor spindle connected to the second unit; a line feed-through extending along the rotational axis from the first unit into the second unit; lines extending from the interior of the first unit through the line feed-through as well as through the second unit into the motor spindle; and a line guiding device formed in the first unit and serving for guiding a part of the lines disposed in the first unit immediately in front of the line feed-through. The line guiding device is formed in a plane (or "layer"), which is oriented perpendicularly to the rotational axis. The line guiding device feeds the lines within the plane/layer upon rotation of the second unit with respect to the first unit such that twisting of the lines in the region of the line feed-through caused by the rotation is reduced or avoided.

According to an embodiment of the invention, the line guiding device is guidable back and forth by rotation of the second unit with respect to the first unit between a first state, in which the line guiding device forms an arcuate segment, and a second state, in which the line guiding device forms a spiral.

According to an embodiment of the invention, the line guiding device has a linking of guide elements rotatable relative to each other.

According to an embodiment of the invention, a first range of the lines located at an end of the line feed-through facing the second unit or in the second unit, is fixedly connected to the second unit such that a first rotation angle $\beta$ of the first range of the lines with respect to the rotational axis D corresponds to a rotation angle with respect to the rotational axis D, by which the second unit is rotated with respect to the first unit, wherein the lines can freely move with respect to the first unit within the line feed-through.

According to an embodiment of the invention, a second range of the lines located at an end of the line feed-through facing the first unit or in the first unit is rotatable independently of the first rotation angle $\beta$ by a second rotation angle $\alpha$ with respect to the rotational axis D by means of the line guiding unit, such that a difference between the first rotation angle $\beta$ and the second rotation angle $\alpha$ corresponds to the amount of twisting of the lines 16 within the line feed-through 15. In this context, "independently" means that the line guiding device can be configured such that rotation of the second unit with respect to the first unit does not necessarily cause automatic feeding of the lines by the line guiding device and thus rotating the second range of the lines. For example, the feeding can be selectively activated upon need if large twistings are to be expected. The feeding can for example be effected such that the first rotation angle $\beta$ corresponds to the second rotation angle $\alpha$. Alternatively, the feeding can be effected such that the first rotation angle $\beta$ is greater than the second rotation angle $\alpha$ if the twisting accepted thereby is still tolerable.

According to an embodiment of the invention, the lines can be fed by means of the line guiding device such that a rotation angle of the lines at an end of the line feed-through facing the first unit corresponds to a rotation angle of the lines within the second unit. Since the two effects "cancel" each other, a (relative) twisting of the lines can be avoided.

According to an embodiment of the invention, the line feed-through has a first tubular element extending along the rotational axis at the end facing the first unit, at the end of which facing away from the second unit a second tubular element is pivotably supported, wherein the orientation of the second tubular element has at least one component extending perpendicularly to the rotational axis, wherein the second tubular element is pivotably supported with respect to a plane, which extends perpendicularly to the rotational axis and through the end of the line feed-through facing the first unit, and wherein the lines extend through the first tubular element and the second tubular element.

According to an embodiment of the invention, the first tubular element, the second tubular element as well as the line guiding device are in operative connection to each other such that the second tubular element upon rotation of the second unit with respect to the first unit by an angle $\alpha$, is also rotated by the angle $\alpha$. Thereby, twisting of the lines within the first and the second tubular element (in particular at the interface thereof) can be avoided.

According to an embodiment of the invention, the lines have at least one of the following lines: a line for supplying lubrication for the bearings of the motor spindle, a line for conducting a temperature signal from temperature sensors of the motor spindle, a line for conducting sealing air, a line for conducting blowing air, a line for conducting cooling lubricant, a line for conducting cooling water for the motor spindle, a line for conducting hydraulic fluid for the clamping device, a line for conducting electric current for a working room lamp, a line for conducting a vibration signal from vibration sensors of the motor spindle, a line for conducting a rotary encoder signal of a rotary encoder of the motor spindle, a line for conducting electric current for a drive of the motor spindle and a grounding line for the motor spindle.

The device according to one of the above mentioned embodiments can be employed in a machine tool. In particular, the device can be mounted on a carriage of the machine tool, which is movable along a guide rail.

In the following, the invention is explained in more detail in exemplary embodiment with reference to the figures. There show.

In the figures, identical or mutually corresponding ranges, components or component groups are denoted with the same reference numbers. Furthermore, it is to be mentioned that the drawings are schematic in nature, that is do not have to be to scale.

Figure 4:
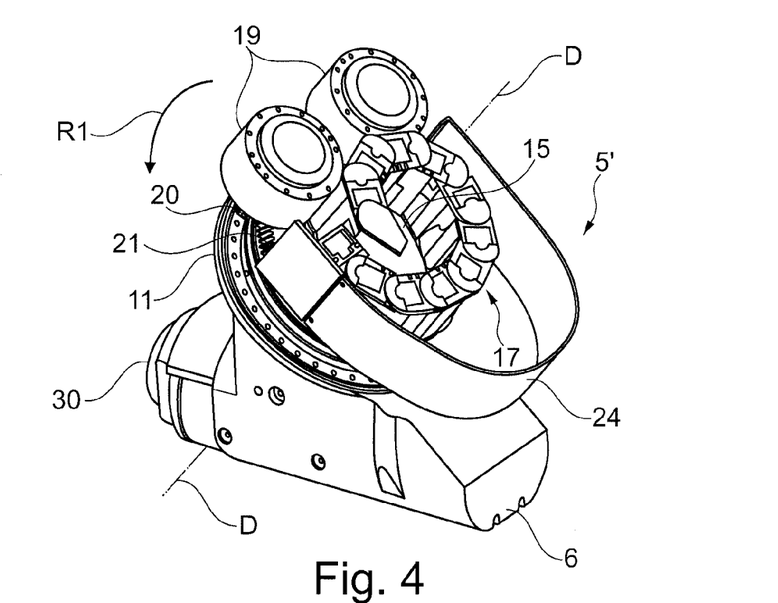
FIG. 4 a part of a device according to an embodiment of the invention in a first state.

FIG. 4 shows a device 5' for employment in a machine tool according to an embodiment of the invention. The device 5' corresponds to the device 5 shown in FIGS. 1 to 3 in its exterior construction. However, a substantial difference is in that in the device 5' a tube 12 is not provided outside of the first unit 9, the second unit 10 as well as the motor spindle 6. Instead, corresponding lines extend to the motor spindle 6 through the interior of the first unit 9 as well as the second unit 10.

The device 5' has: a first unit 9; a second unit 10 connected to the first unit 9, wherein the first unit 9 is rotatable around a rotational axis D relative to the second unit 10; a motor spindle 6 rigidly connected to the second unit 10; a line feed-through 15 extending along the rotational axis D from the first unit 9 into the second unit 10; lines 16 extending from the interior of the first unit 9 through the line feed-through 16 as well as through the second unit 10 into the motor spindle 6; and a line guiding device 17 (also referred to as a cable carrier or energy carrying chain) formed in the first unit 9 and serving for guiding a part of the lines 16 disposed in the first unit 9 immediately in front of the line feed-through 15. The part of the line feed-through 15 seen in FIGS. 4 and 5 (i.e. the end of the line feed-through 15 facing the first unit 9) is formed as a tubular element, which protrudes into the first unit 9. The part of the line feed-through 15 protruding into the first unit 9 could also be omitted. The line guiding device 17 is formed in a plane or "layer", which is oriented perpendicularly to the rotational axis D, wherein the line guiding device 17 feeds the lines 16 upon rotation of the second unit 10 with respect to the first unit 9 such that twisting of the lines 16 in the region of the line feed-through 15 normally caused by the rotation is avoided or reduced.

Figure 5:
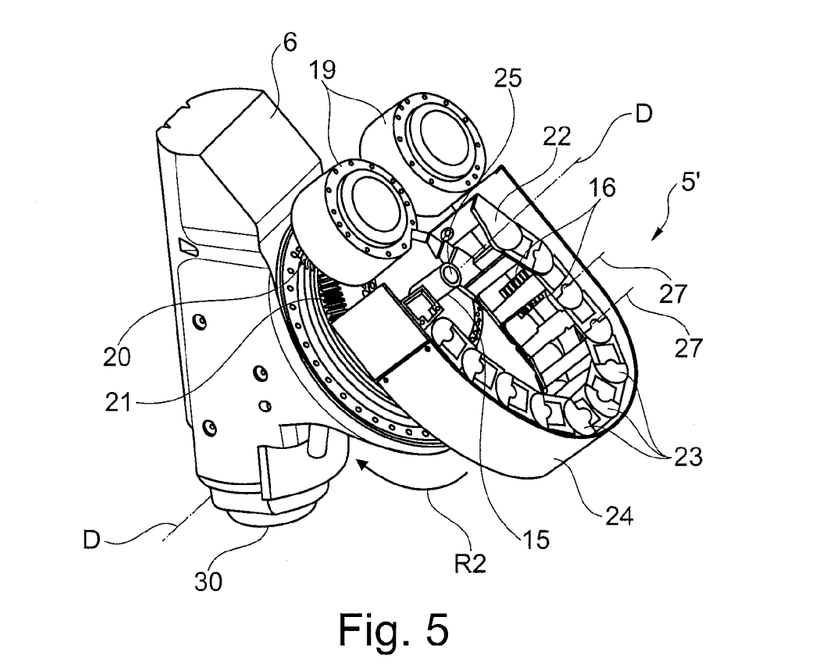
FIG. 5 a part of a device according to an embodiment of the invention in a second state.

In other words: if the motor spindle 6 rotates by mutual rotation of the first unit 9 and the second unit 10 in a direction indicated by the arrow R1, in order to arrive at the rotational state shown in FIG. 4, thus, the line guiding device 17 also rotates in the direction indicated by the arrow R1 such that the line guiding device 17 assumes a spiral shape. However, if the motor spindle 6 is rotated by mutual rotation of the first unit 9 and the second unit 10 in a direction, which is indicated by the arrow R2 (opposite to the rotational direction R1), thus, the line guiding device 17 is transferred from the spiral shape into a shape corresponding to an arcuate segment, as shown in FIG. 5. The mutual rotation of the first unit 9 with the second unit 10 is effected via electric motors 19 operatively connected to a ring gear 21 via pinions 20, which in turn is connected to the second unit 10. By rotating the line guiding device 17 with the rotational direction R1 or R2, i.e. by co-rotating the end 22 of the line guiding device 17 upon the rotation, it is effected that the part of the lines 16 located within the end 22 and thereby the entire part of the lines 16 located within the line guiding device 17 is fed with the rotation. Since the lines 16 extend from the end 22 of the line guiding device 17 into the line feed-through 15, it is in particular effected by the feeding that the lines 16 do not twist in the region between the end 22 of the line guiding device 17 and an input 25 of the line feed-through 15.

In this embodiment, the line guiding device 17 has a linking of guide elements 23 rotatable relative to each other. The guide elements 23 can mutually rotate around axes 27 oriented parallel to the rotational axis D. In this manner, the linking of the guide elements overall forms a type of cage, in which the lines 16 are provided.

The extent of feeding the lines 16 can turn out differently: thus, the feeding of the lines 16 can be effected such that twisting of the lines 16 in a region between the end 22 of the line guiding device 17 and an input 25 of the line feed-through 15 is accepted to a certain extent; in this case, the feeding can turn out slightly less than the rotation of the second unit 10 with respect to the first unit 9. If twisting of the lines 16 is to be completely avoided, thus, the feeding of the line guiding device 17 should correspond to the rotation of the second unit 10 with respect to the first unit 9.

In order to prevent the line guiding device 17 from moving in uncontrolled manner within the first device 9 upon rotation of the second unit 10 with respect to the first unit 9, in this embodiment, a belt 24 is provided, which has an arcuate shape, to the inside of which the line guiding device 17 clings in the unrolled state (that is in the arcuate state).

Figure 6:
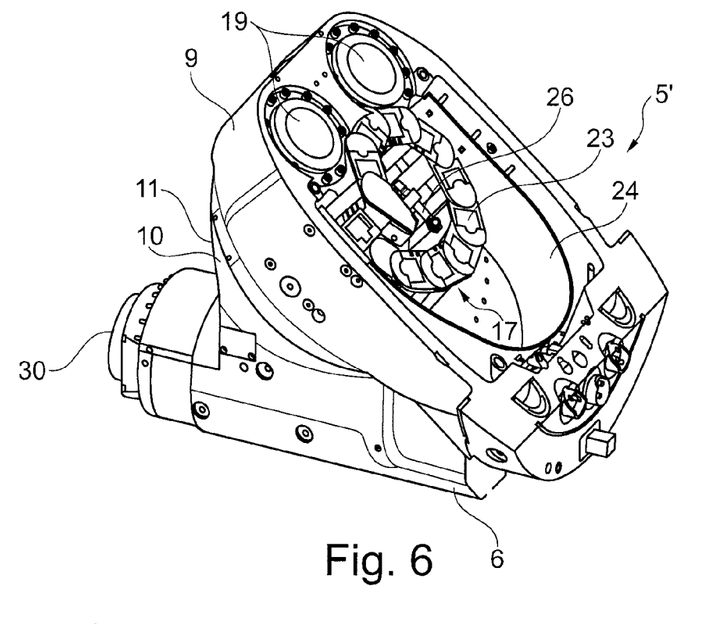
FIG. 6 a part of a device according to an embodiment of the invention in a first state.
Figure 7:
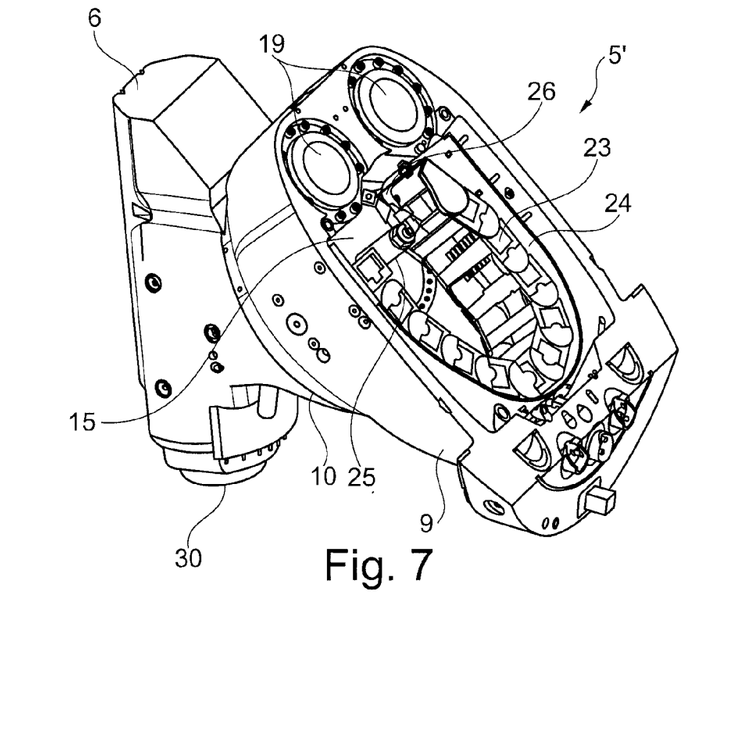
FIG. 7 a part of a device according to an embodiment of the invention in a second state.

FIGS. 6 and 7 show an embodiment, which corresponds to the embodiment shown in FIGS. 4 and 5 (in addition, a part of an outer wall of the first unit 9 is seen, which is omitted in FIGS. 4 and 5). In addition, in FIGS. 6 and 7, it is shown that a tubular element 26 is pivotably supported on the input 25 of the line feed-through 15 (pivotable in a plane extending perpendicularly to the rotational axis D and through the input 25). However, the tubular element 26 could also be inclined by a certain angle with respect to this plane. The lines 16 extend from the end 22 of the line guiding device 17 through the tubular element 26 into the line feed-through 15. Upon rotation of the second device 10 with respect to the first device 9, the line guiding device 17 is fed together with the tubular element 26, where-by twisting of the lines 16 can be avoided. Twisting can for example be completely avoided if the rotation angle of the tubular element 26 corresponds to the rotation angle, by which the second unit 10 is rotated with respect to the first unit 9. The avoidance or the reduction of the twisting allows further rotating the second unit 10 with respect to the first unit 9 than it is possible in the embodiment shown in FIGS. 2 and 3, since neither twisting of the lines 16 nor an external tube 12 can generate a force, which is able to prevent rotation of the second unit 10 with respect to the first unit 9.

Figure 8:
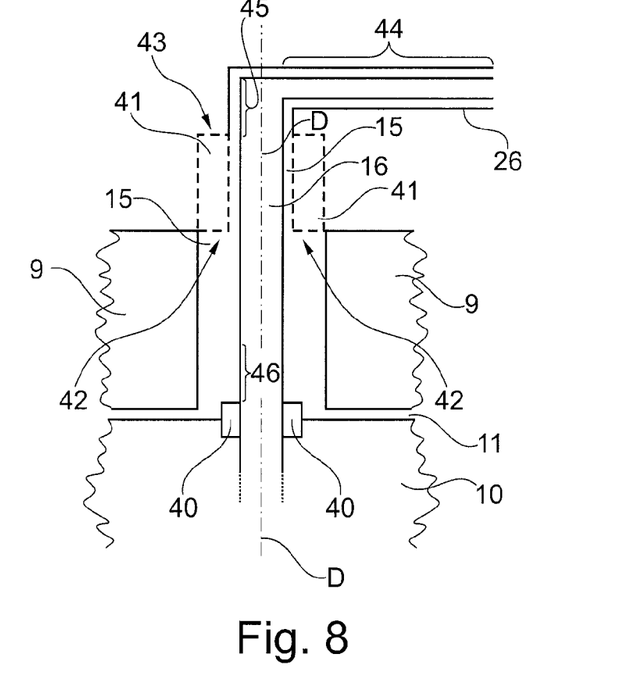
FIG. 8 a part of a device according to an embodiment of the invention.

In FIG. 8, a schematic cross-sectional illustration of the extension of the lines 16 between the first unit 9 and the second unit 10 according to an embodiment of the invention is shown. The second unit 10 is rotatable with respect to the first unit 9 along the sectional plane 11. The lines 16 are fixedly connected to the second unit 10 via a fastener 40. The fastener 40 does not necessarily have to be disposed at an interface between the first unit 9 and the second unit 10, as shown in FIG. 8, but can also be provided at another suitable location within the second unit 10. The fastener can for example have a retaining element surrounding the lines 16 and fixed to the second unit 10 by means of screws or otherwise. As is apparent from FIG. 8, the lines 16 are not connected to the first unit 9 within the line feed-through 15, i.e. freely movable with respect to the first unit 9.

If the second unit 10 rotates with respect to the first unit 9 along the sectional plane 11, the lines 16 rotate with the second unit due to their attachment to the second unit 10. Thereby, the lines 16 also rotate within the feed-through 15 relative to the first unit 9. In order to prevent twisting of the lines 16 within the feed-through 15 by this rotation, according to the invention, an upper range 45 of the lines 16 (located above the feed-through 15) is at least partially fed with the rotation of the second unit 10. The feeding of the lines 16 can for example be effected by pivoting the second tubular element 26 (in which the lines 16 extend) with respect to the first unit 9 (parallel to the sectional plane 11), as shown in FIGS. 6 and 7. In this example, if the rotation angle of the second tubular element 26 (the angle, by which the second tubular element 26 is pivoted in the sectional plane 11), corresponds to the rotation angle, by which the second unit 10 is rotated with respect to the first unit 9 along the sectional plane 11, thus, twisting of the lines 16 does not occur within the feed-through 15. In contrast, if the rotation angle of the second tubular element 26 is less than the rotation angle, by which the second unit 10 is rotated with respect to the first unit 9 along the sectional plane 11, thus, reduced twisting of the lines 16 occurs within the feed-through 15 (reduced compared to the case, in which feeding of the lines 16 would not occur at all). The feeding of the lines 16 can also be effected by means of another device, i.e. the second tubular element 26 is only exemplary as the feeding element. Optionally, the second tubular element 26 can also be omitted, and only the line guiding device 17 (chain) can be used for guiding the lines.

The feed-through 15 can have a first tubular element 41 at its end facing the first unit 9 (schematically indicated by dashed lines), the lower end 42 of which is fixedly connected to the first unit 9 and on the upper end 43 of which the second tubular element 26 is pivotably supported. Herein, the second tubular element 26 is supported such that a part 44 of the second tubular element 26 extending perpendicularly to the rotational axis D is pivoted in a plane extending perpendicularly to the rotational axis D. The first tubular element 41 can be omitted, if appropriate.

Figure 9:
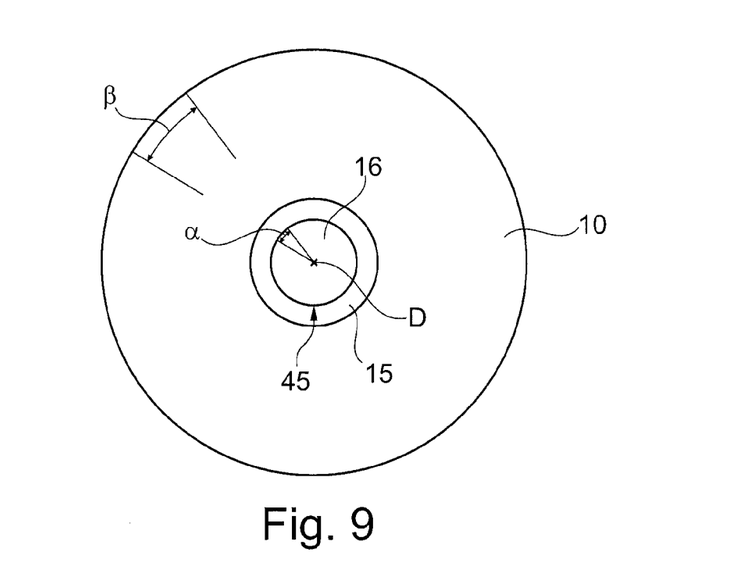
FIG. 9 a part of a device according to an embodiment of the invention.

In FIG. 9, a plan view of parts of the embodiment shown in FIG. 8 is illustrated. In FIG. 9, the case is shown, in which upon rotation of the second unit 10 with respect to the first unit 9 by an angle β with respect to the rotational axis D, the lines 16 are fed by means of the second tubular element 26 such that they rotate by an angle α with respect to the rotational axis D in the upper range 45. In contrast, a lower range 46 of the lines near the fastener 40 rotates by the angle β with respect to the rotational axis D since this part is fixedly connected to the second unit 10. If the angle α corresponds to the angle β, thus, twisting of the lines 16 does not arise within the feed-through 15. If α<β, slight twisting occurs. If α<<β or α=0, thus, strong twisting occurs. The extent of feeding of the lines 16 therefore determines the amount of twisting within the line feed-through 15.

The lines 16 guided by the line guiding device 17 can for example have the following lines: a line for supplying lubrication for the bearings of the motor spindle 6, a line for conducting a temperature signal from temperature sensors of the motor spindle 6, a line for conducting sealing air, a line for conducting blowing air, a line for conducting cooling lubricant, a line for conducting cooling water for the motor spindle 6, a line for conducting hydraulic fluid (for example for a clamping device in the motor spindle 6), a line for conducting electric current for a working room lamp, a line for conducting a vibration signal from vibration sensors of the motor spindle 6, a line for conducting a rotary encoder signal of a rotary encoder of the motor spindle 6, a line for conducting electric current for a drive of the motor spindle 6 and a grounding line for the motor spindle 6. Lines for other purposes can also be employed.

The embodiments of the device 5' shown in FIGS. 4 to 7 can be employed in any machine tools. For example, the device 5' can be used in the machine tool 1 shown in FIG. 1 instead of the device 5. I.e., the device 5' would be movable along the third guide structure 4 in Y-direction by means of the carriage 30.

The invention claimed is:

1. A device for employment in a machine tool, including:
   a first unit,
   a second unit connected to the first unit, wherein the first unit is rotatable around a rotational axis relative to the second unit,
   a motor spindle connected to the second unit,
   a line feed-through extending along the rotational axis from the first unit into the second unit,
   lines extending from the interior of the first unit through the line feed-through as well as through the second unit into the motor spindle, and
   line guiding device formed in the first unit and serving for guiding a part of the lines disposed in the first unit immediately in front of the line feed-through, wherein the line guiding device is formed in a plane oriented perpendicularly to the rotational axis, and wherein the line guiding device feeds the lines upon rotation of the second unit with respect to the first unit such that twisting of the lines in the region of the line feed-through caused by the rotation is avoided or reduced,
   wherein the line guiding device can be guided back and forth upon rotation of the second unit with respect to the first unit between a first state, in which the line guiding device forms an arcuate segment, and a second state, in which the line guiding device forms a spiral.

2. A device for employment in a machine tool, including:
a first unit,
a second unit connected to the first unit, wherein the first unit is rotatable around a rotational axis relative to the second unit,
a motor spindle connected to the second unit,
a line feed-through extending along the rotational axis from the first unit into the second unit,
lines extending from the interior of the first unit through the line feed-through as well as through the second unit into the motor spindle, and
line guiding device formed in the first unit and serving for guiding a part of the lines disposed in the first unit immediately in front of the line feed-through, wherein the line guiding device is formed in a plane oriented perpendicularly to the rotational axis, and wherein the line guiding device feeds the lines upon rotation of the second unit with respect to the first unit such that twisting of the lines in the region of the line feed-through caused by the rotation is avoided or reduced,
wherein the line guiding device has a linking of guide elements rotatable relative to each other.

3. A device for employment in a machine tool, including:
a first unit,
a second unit connected to the first unit, wherein the first unit is rotatable around a rotational axis relative to the second unit,
a motor spindle connected to the second unit,
a line feed-through extending along the rotational axis from the first unit into the second unit,
lines extending from the interior of the first unit through the line feed-through as well as through the second unit into the motor spindle, and
line guiding device formed in the first unit and serving for guiding a part of the lines disposed in the first unit immediately in front of the line feed-through, wherein the line guiding device is formed in a plane oriented perpendicularly to the rotational axis, and wherein the line guiding device feeds the lines upon rotation of the second unit with respect to the first unit such that twisting of the lines in the region of the line feed-through caused by the rotation is avoided or reduced,
wherein a first range of the lines located at an end of the line feed-through facing the second unit or in the second unit is fixedly connected to the second unit such that a first rotation angle of the first range of the lines with respect to the rotational axis corresponds to a rotation angle with respect to the rotational axis, by which the second unit is rotated with respect to the first unit, wherein the lines can freely move with respect to the first unit within the line feed-through.

4. The device according to claim 3,
wherein by means of the line guiding device a second range of the lines located at an end of the line feed-through facing the first unit or in the first unit, is rotatable by a second rotation angle with respect to the rotational axis independently of the first rotation angle, such that a difference between the first rotation angle and the second rotation angle corresponds to the amount of twisting of the lines within the line feed-through.

5. The device according to claim 4,
wherein the first rotation angle corresponds to the second rotation angle.

6. A device for employment in a machine tool, including:
a first unit,
a second unit connected to the first unit, wherein the first unit is rotatable around a rotational axis relative to the second unit,
a motor spindle connected to the second unit,
a line feed-through extending along the rotational axis from the first unit into the second unit,
lines extending from the interior of the first unit through the line feed-through as well as through the second unit into the motor spindle, and
line guiding device formed in the first unit and serving for guiding a part of the lines disposed in the first unit immediately in front of the line feed-through, wherein the line guiding device is formed in a plane oriented perpendicularly to the rotational axis, and wherein the line guiding device feeds the lines upon rotation of the second unit with respect to the first unit such that twisting of the lines in the region of the line feed-through caused by the rotation is avoided or reduced,
wherein the line feed-through has a first tubular element extending along the rotational axis at the end facing the first unit, at the end of which facing away from the second unit a second tubular element is pivotably supported, wherein the orientation of the second tubular element has at least one component extending perpendicularly to the rotational axis, wherein the second tubular element is pivotably supported with respect to a plane extending perpendicularly to the rotational axis, and wherein the lines extend through the first tubular element and the second tubular element.

7. The device according to claim 6,
wherein the second tubular element upon rotation of the second unit with respect to the first unit by an angle A, is also rotated by the angle A.

8. The device according to claim 1,
wherein the lines have at least one of the following lines: a line for supplying lubrication for the bearings of the motor spindle, a line for conducting a temperature signal from temperature sensors of the motor spindle, a line for conducting sealing air, a line for conducting blowing air, a line for conducting cooling lubricant, a line for conducting cooling water for the motor spindle, a line for conducting hydraulic fluid for a clamping device, a line for conducting electric current for a working room lamp, a line for conducting a vibration signal from vibration sensors of the motor spindle, a line for conducting a rotary encoder signal of a rotary encoder of the motor spindle, a line for conducting electric current for a drive of the motor spindle and a grounding line for the motor spindle.

9. A machine tool,
including a device according to claim 1.

10. The machine tool according to claim 9,
wherein the device is mounted on a carriage, which is movable along a guide rail of the machine tool.

11. A machine tool,
including a device according to claim 2.

12. The machine tool according to claim 11,
wherein the device is mounted on a carriage, which is movable along a guide rail of the machine tool.

13. A machine tool,
including a device according to claim 3.

14. The machine tool according to claim 13,
wherein the device is mounted on a carriage, which is movable along a guide rail of the machine tool.

15. A machine tool,
including a device according to claim 6.

16. The machine tool according to claim 15,
wherein the device is mounted on a carriage, which is movable along a guide rail of the machine tool.

\* \* \* \* \*